United States Patent [19]

Liao

[11] Patent Number: 5,201,563
[45] Date of Patent: Apr. 13, 1993

[54] MOTOR VEHICLE WINDSHIELD CURTAIN CONTROL

[76] Inventor: Chuen R. Liao, No. 10, Alley 3, Lane 127, Lei Chung Street, Taichung City, Taiwan

[21] Appl. No.: 852,981

[22] Filed: Mar. 17, 1992

[51] Int. Cl.$^5$ .............................................. B60J 3/02
[52] U.S. Cl. .................... 296/97.4; 296/97.8; 296/140; 160/370.2; 160/35; 160/84.1
[58] Field of Search ............ 296/97.4, 97.8, 140, 296/143, 141; 160/DIG. 2, DIG. 3, 7, 84.1, 370.2, 32, 33, 35, 36, 271-273.1, 321

[56] References Cited

U.S. PATENT DOCUMENTS

| | | | |
|---|---|---|---|
| 1,007,499 | 10/1911 | Sprinchorn | 160/35 X |
| 1,454,681 | 5/1923 | Latiff | 296/140 |
| 1,755,734 | 4/1930 | Hall . | |
| 1,758,220 | 5/1930 | Currivan . | |
| 1,762,480 | 6/1930 | Marenti . | |
| 1,811,631 | 6/1931 | Huebner . | |
| 1,931,438 | 10/1933 | Hitz . | |
| 2,444,524 | 7/1948 | Parrish, Jr. . | |
| 4,149,749 | 4/1979 | Canal . | |
| 4,174,134 | 11/1979 | Mathis | 296/143 X |
| 4,363,513 | 12/1982 | Sahar | 296/140 |
| 4,660,612 | 4/1987 | Anderson | 160/173 |
| 4,665,965 | 5/1987 | Pasquier et al. | 160/310 |
| 4,697,843 | 10/1987 | Tomforde . | |
| 4,979,775 | 12/1990 | Klose | 296/97.1 |
| 5,042,866 | 8/1991 | Cody | 296/97.4 |
| 5,067,541 | 11/1991 | Coslett | 160/84.1 |

FOREIGN PATENT DOCUMENTS

0378336  8/1932  United Kingdom ............... 296/97.8

Primary Examiner—Dennis H. Pedder
Attorney, Agent, or Firm—Bacon & Thomas

[57] ABSTRACT

A motor vehicle windshield curtain control comprising a casing transversely fastened behind the windshield of a motor vehicle at a top, two side tracks respectively obliquely extending downward from said casing and fastened behind said windshield at two opposite sides, a curtain received inside said casing, a revolving axle driven by a reversible motor to rotate two endless belts via rollers and pulleys, and a curtain having a rear end edge secured to a division plate inside said casing, a front end edge secured between said two endless belts, and two opposite side edges secured to two round rods inside said two side tracks by loops, wherein rotating said reversible motor in one direction causes said curtain to be let off and stretched between said two side tracks to shut off said curtain; rotating said reversible motor in an opposite direction causes said curtain to be taken up and received inside said casing.

5 Claims, 11 Drawing Sheets

MOTOR VEHICLE WINDSHIELD CURTAIN CONTROL

BACKGROUND OF THE INVENTION

The present invention relates to curtain controls, and more particularly, the present invention relates to a windshield curtain control secured inside a motor vehicle to automatically let off or take up a windshield curtain.

Various shielding devices are known and used in preventing the light of the sun from coming into a motor vehicle. For examples: In U.S. Pat. No. 1,755,734 to E. E. Hall, there is disclosed a motor vehicle rear curtain operator which uses spring means to control a curtain; In U.S. Pat. No. 1,758,220 to J. F. Currivan, there is disclosed a window curtain control which uses a gear drive to move a rope so as to draw up or let off a curtain; In U.S. Pat. No. 1,762,480 to G. Marenti, there is disclosed an antiglare attachment which uses a drive means to drive a roller and lifting cables so as to control a shield; In U.S. Pat. No. 1,822,631 to W. J. Huebner, there is disclosed a shade controlling apparatus to control a shade in hanging over the roof and rear part of a motor vehicle; In U.S. Pat. No. 1,931,438 to H. B. Hitz, there is disclosed an antiglare device which uses gears and screws to move a shield into operation; In U.S. Pat. No. 2,444,528 to M. Parrish, Jr, there is disclosed a visor which is movably mounted on a frame and moved to slide on two side rails thereof; In U.S. Pat. No. 4,149,749 to Romano G. Canal, Magliaso, there is disclosed a roof lining element for vehicle cabins which comprises a frame having means for receiving and guiding visors movable between an inoperative retracted position and an operative extracted position; In U.S. Pat. No. 4,697,843 to Johann Tomforde, there is disclosed an anti-glare device for motor vehicles which includes a sun visor arranged on the under-side of the front hollow transverse roof beam and moved by a drive means from a basic position into an extended position; In U.S. Pat. No. 4,979,775 to Odo Klose, Wuppertal, there is disclosed an axially displaceable window shade for windshield or the like which includes a winding shaft and a shade strip, which winding shaft is axially displaced when the strip is pulled past a window or wound back onto the shaft; In German Patent No. 874,658 there is disclosed a sun visor which includes a first frame sliding inside a second frame; In German Patent No. 24 45 408, there is disclosed an anti-dazzle vehicle driven screen which includes a protective panel adjustably held in pocket of inflexible inner roof element; In Japanese Patent No. 67621 to Yurio Kashiwara, there is disclosed a window shade for car which includes a reflecting panel that can be pulled out from a housing container to prevent the sun beam from coming into a cabin, or pushed back into the housing container; In Japanese Patent No. 186425 to Norishiho Kitsumoto, there is disclosed an automatic sun visor for automobile which includes a bellows type sun visor arranged at the upper section of the front window of a car and reciprocated by means of the operation of a motor controlled by a photoreceptor sensor. The aforesaid devices are different in structure and operation, but are commonly used in preventing the light of the sun or an illuminator from coming into a motor vehicle. The present invention has been accomplished for the same purpose.

SUMMARY OF THE INVENTION

According to one aspect of the present invention, a motor vehicle windshield curtain control comprises a casing to hold a curtain permitting it to be extended out and hung between two side tracks behind the windshield at two opposite sides, by means of the operation of a reversible motor in driving two opposite endless belts to rotate on rollers and pulleys.

According to another aspect of the present invention, the curtain has a rear end edge secured to a division plate inside the casing, a front end edge secured between the two opposite endless belts, and two opposite side edges loosely secured to two round rods inside the two side tracks by loops.

According to still another aspect of the present invention, the two side tracks are bilaterally disposed behind the windshield, each having a channel longitudinally disposed at an inner side for moving the curtain, permitting the curtain to be drawn up and received inside the casing when the endless belts are rotated in one direction, or permitting the curtain to be extended out to wholly or partly shut off the windshield when the endless belts are rotated in an opposite direction.

According to still another aspect of the present invention, an external control switch is provided to control the reversible motor so that the curtain can be extended out into the operative position or drawn up into the non-operative position.

DETAILED DESCRIPTION OF THE PREFERRED EMBODIMENTS

Figure 1:
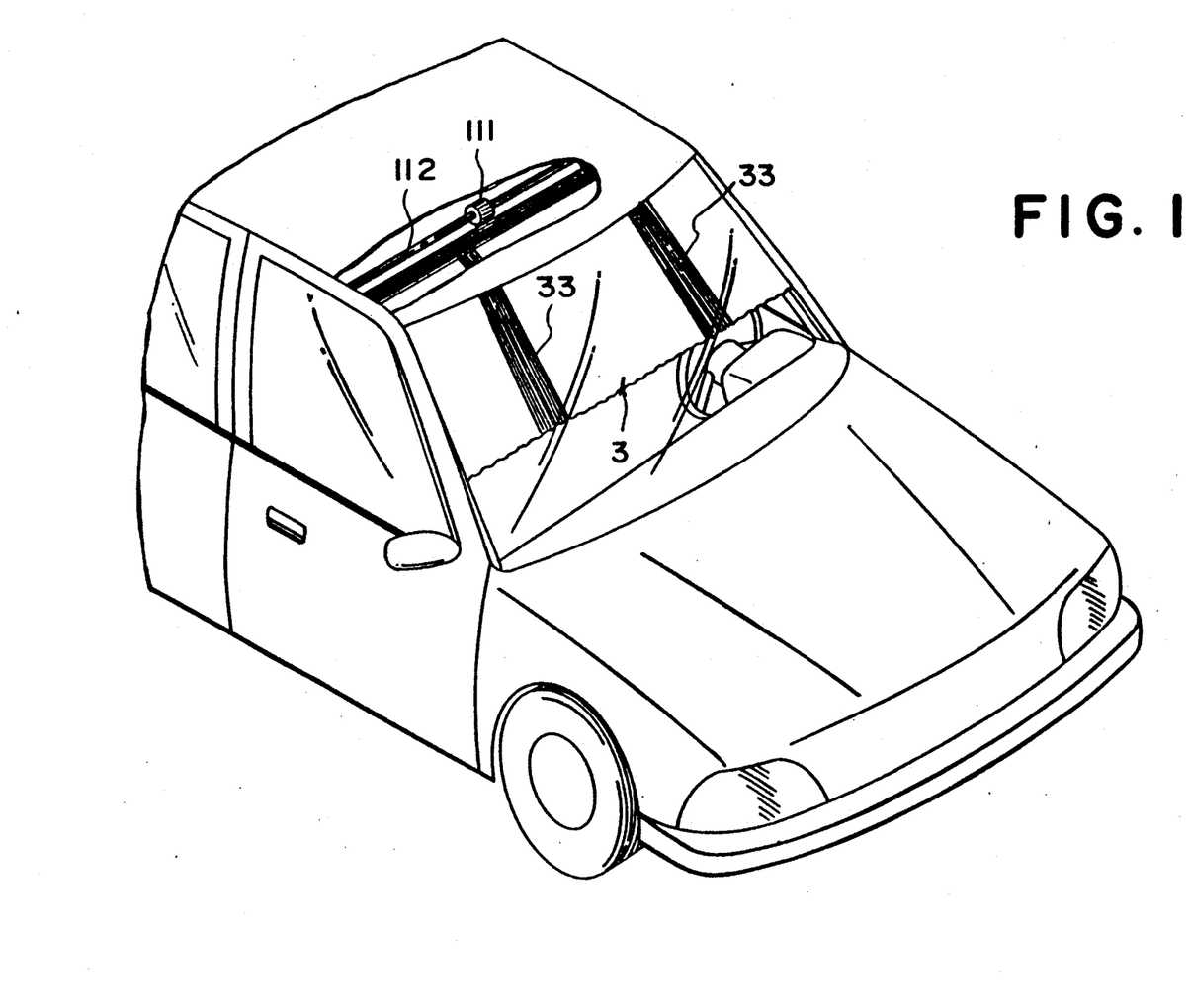
FIG. 1 illustrates the installation of the present invention in a motor vehicle.
Figure 2:
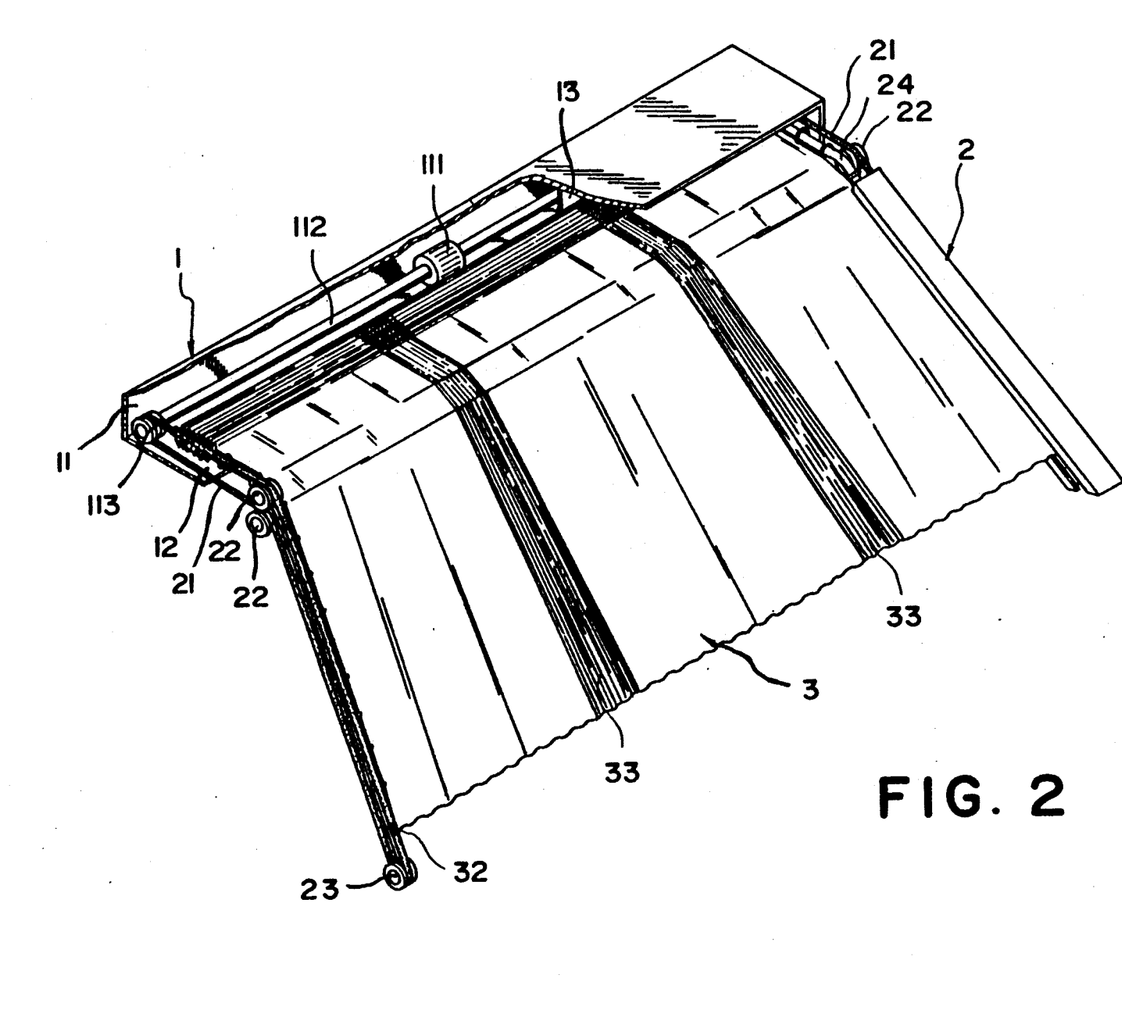
FIG. 2 is a perspective view of a windshield curtain control according to the present invention.
Figure 3:
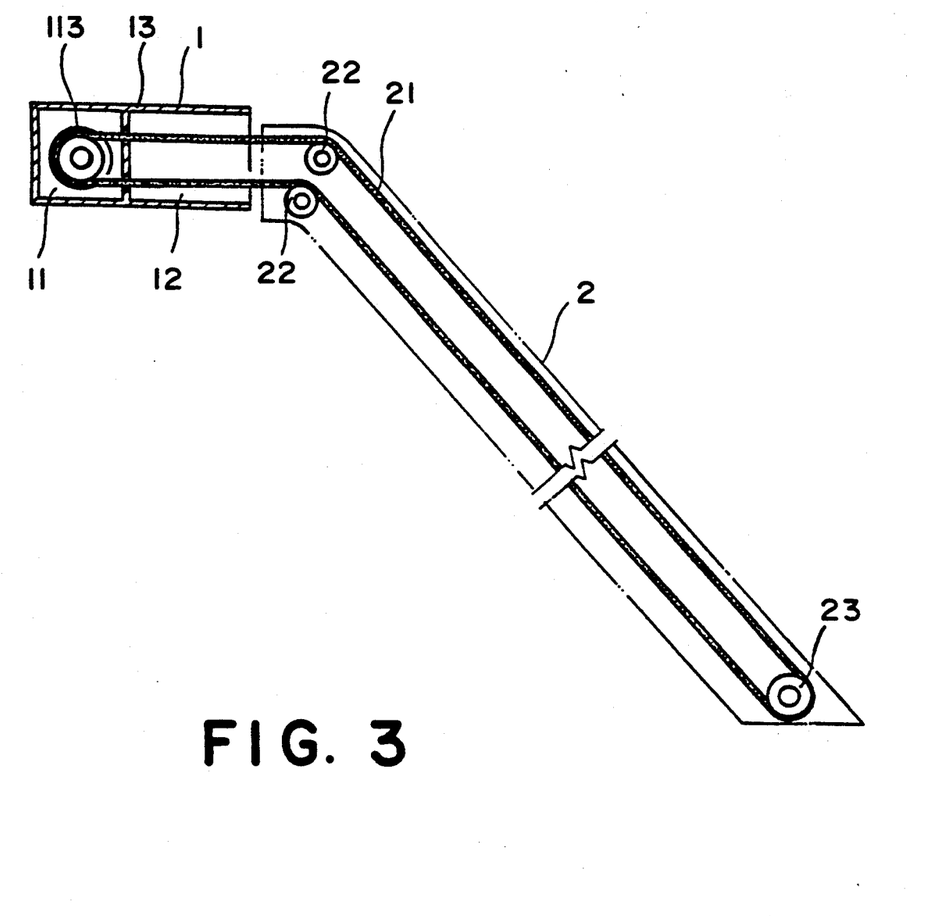
FIG. 3 is a plain side view thereof showing the positioning of an endless belt in either side track.
Figure 4:
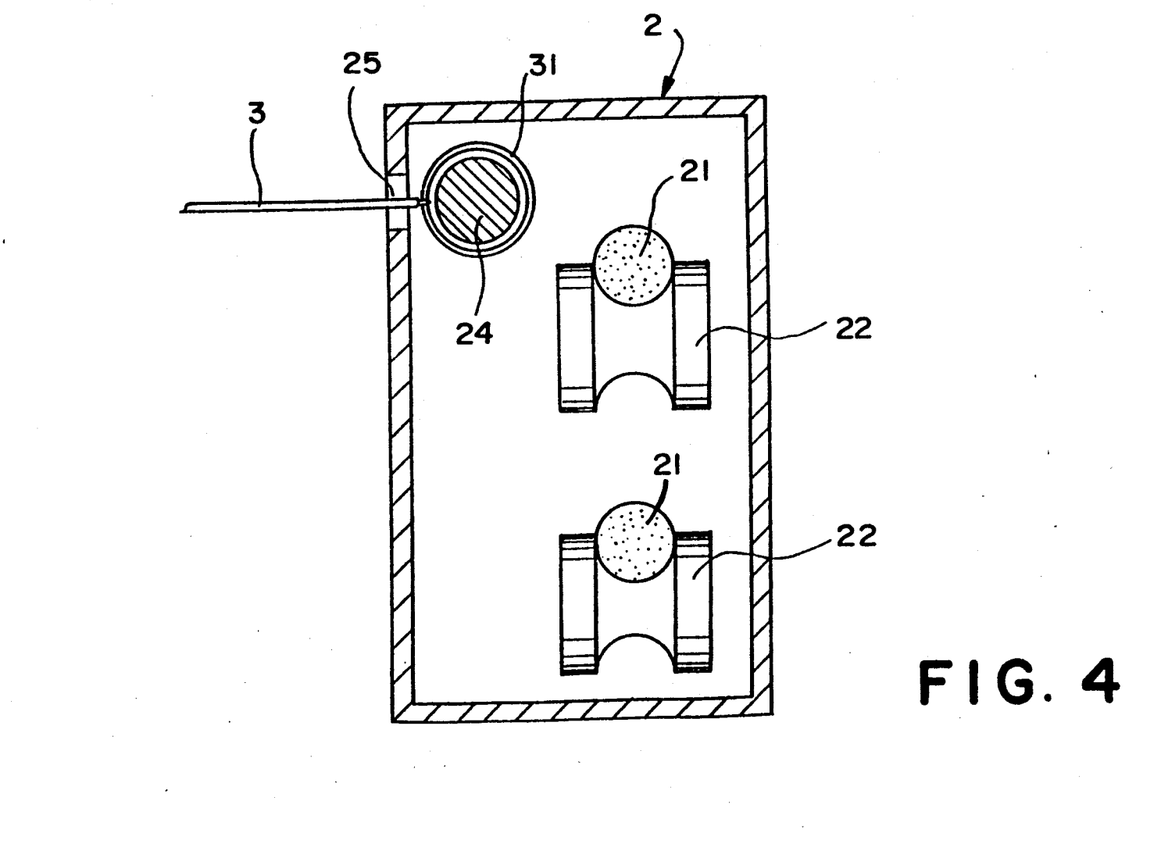
FIG. 4 is a cross section of either side track showing the relative positions of the round rod and the intermediate pulleys therein.
Figure 5:
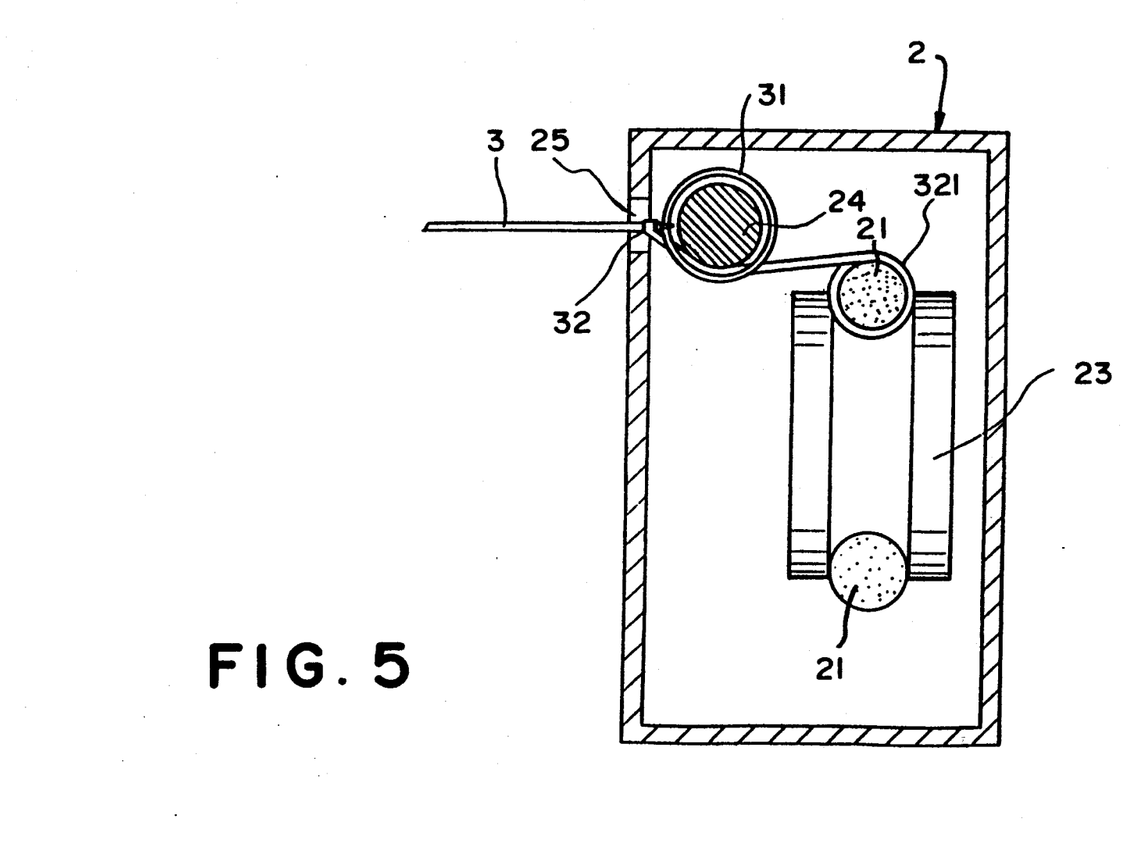
FIG. 5 is another cross section of either side track showing the relative positions of the round rod, the rear pulley and the connecting strip of the curtain.

Referring to FIGS. 1 and 2, a windshield curtain control is generally comprised of a casing 1, two symmetrical side tracks 2, and a curtain 3. The casing 1 is fastened at the underside of the front hollow transverse roof beam inside a motor vehicle, and internally divided into a first chamber 11 and a second chamber 12 by a division plate 13. The first chamber 11 is provided to hold a reversible motor 111 and a revolving axle 112. The revolving axle 112 is driven to rotate by the reversible motor 111, and has two rollers 113 coupled to the two opposite ends thereof. The two symmetrical side tracks 2 are respectively connected to the two opposite ends of the casing 1 and bilaterally secured behind the windshield of the motor vehicle for moving the curtain 3. Each side track 2 has a channel 25 longitudinally disposed at an inner side thereof for inserting the curtain 3, two intermediate pulleys 22 at one end adjacent to either end of the casing 1, and a rear pulley 23 at an opposite end. An endless belt 21 is mounted on the roller 113 at either end of the casing 11 and the rear pulley 23 in either side track 2 and guided by the intermediate pulleys 22 in the same side track 2 (see FIG. 3).

Figure 6:
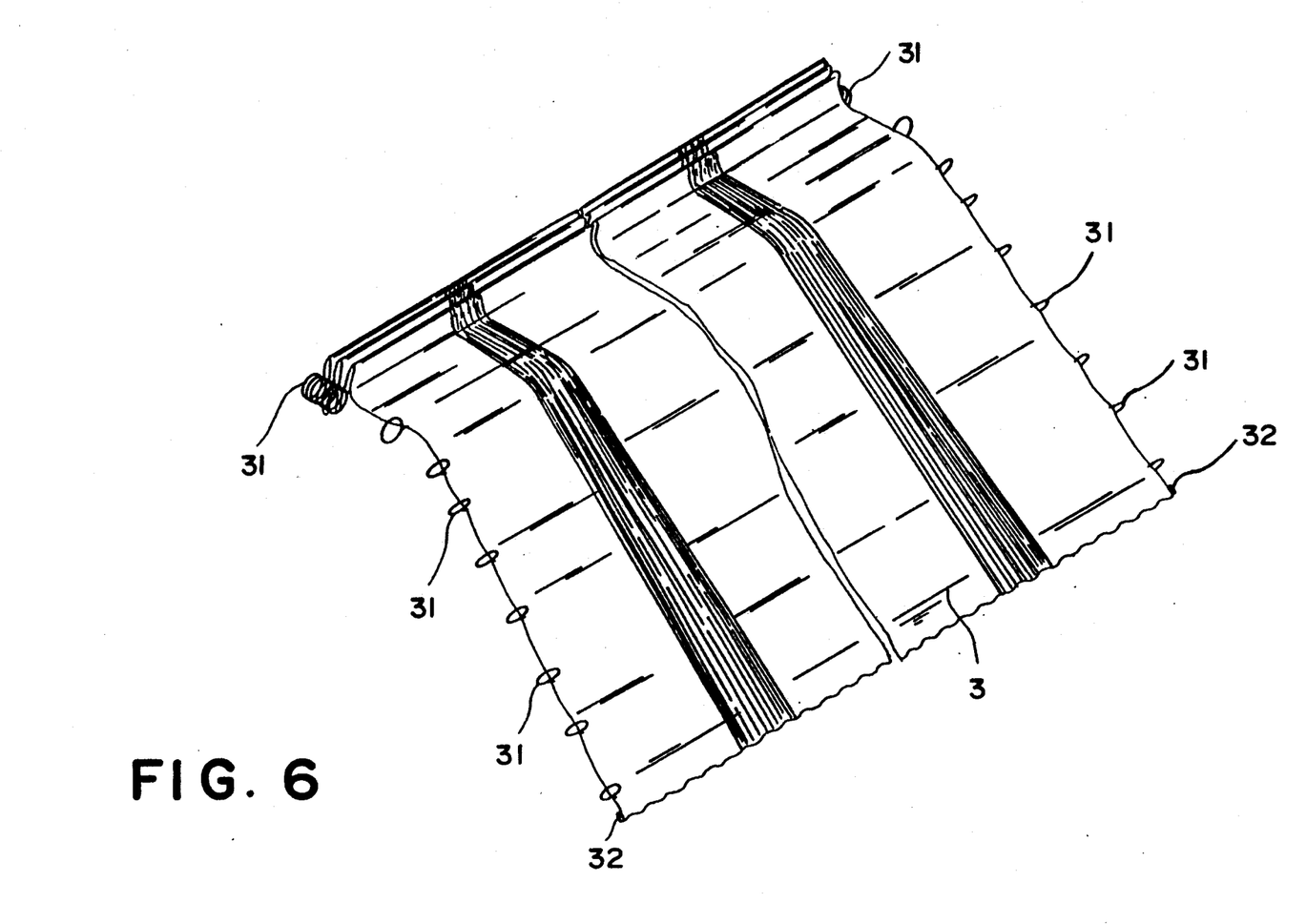
FIG. 6 is an extended out view of the curtain.
Figure 7:
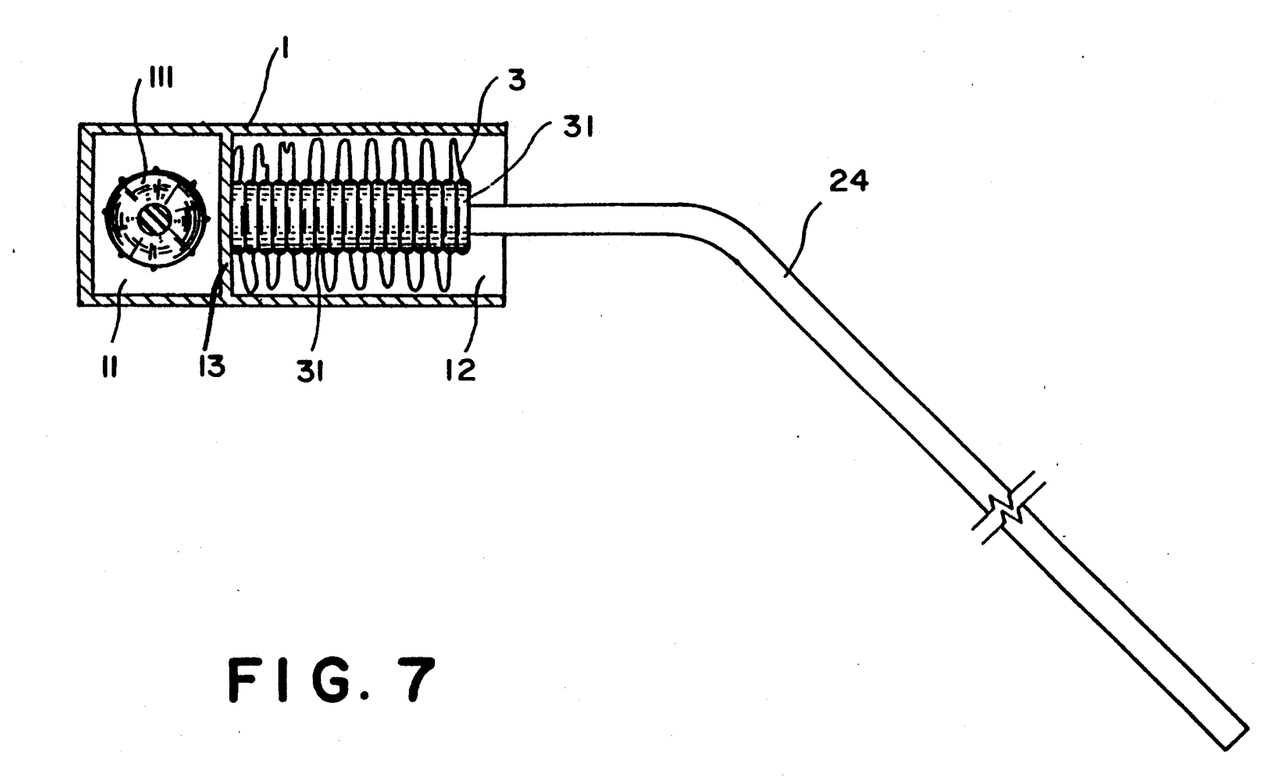
FIG. 7 is a plain side view showing that the curtain has been taken up and received inside the casing.
Figure 8:
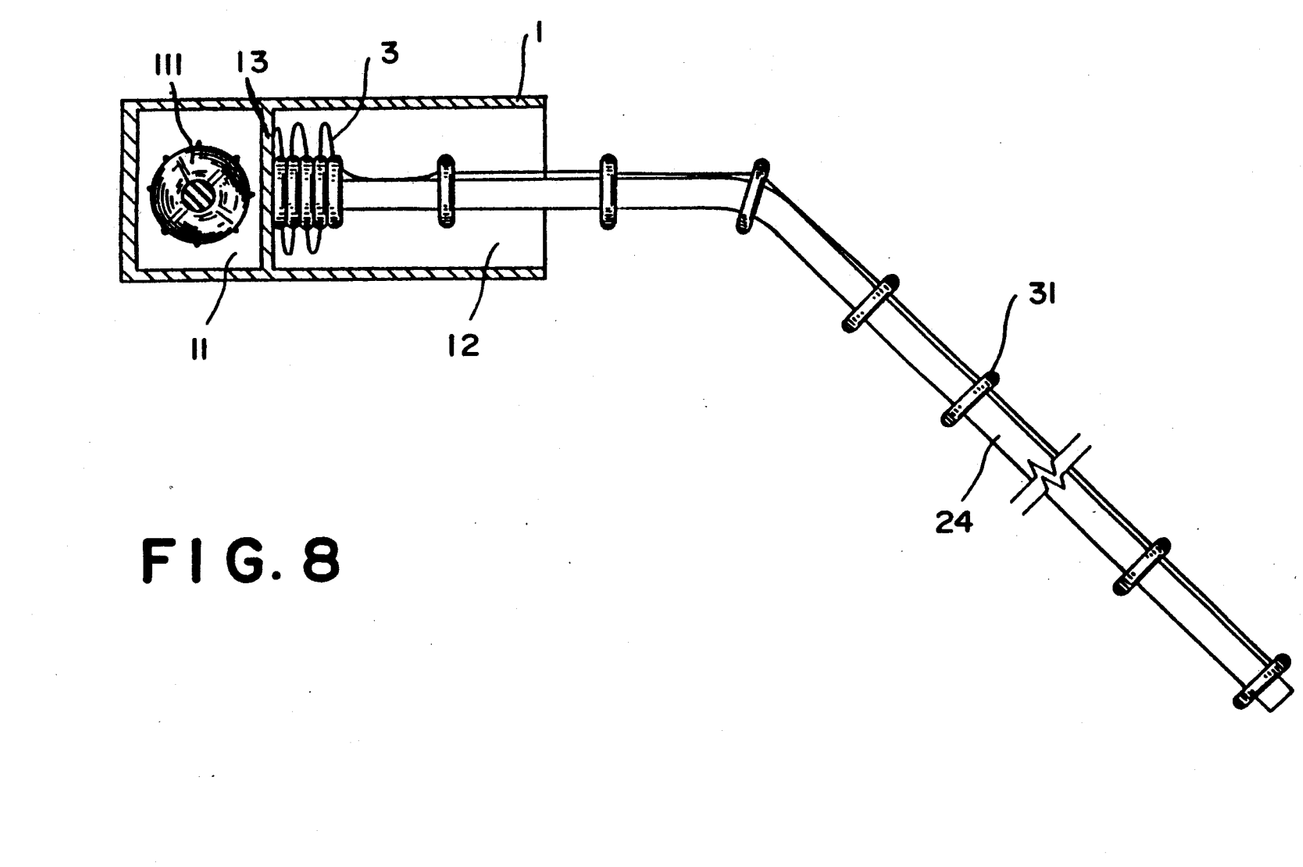
FIG. 8 is a plain side view showing that the curtain has been let off into operation.

Referring to FIGS. 4, 5, 6, 7 and 8, each side track 2 has a round rod 24 longitudinally fastened behind the channel 25 thereof for holding the curtain 3 by loops 31. As illustrated in FIG. 6, the curtain 3 has a plurality of loops 31 on the two opposite side edges thereof respectively sleeved on the round rods 24 in the two side tracks 2 (see FIG. 8). The two opposite ends 32 of the front edge of the curtain 3 are respectively secured to the two endless belts 21 (which are mounted on the rollers 113 of the revolving axle 112 and the rear pulleys 23 inside the side tracks 2) by connecting strips 321 (see FIG. 5). The rear edge (not shown) of the curtain 3 is secured to the division plate 13. Therefore, rotating the reversible motor 111 in one direction causes the endless belts 21 to let off the curtain 3; rotating the reversible motor 111 in an opposite direction causes the endless belts 21 to take up the curtain 3. When the curtain 3 is taken up, the loops 31 are gathered inside the second chamber 12 at two opposite ends (see FIG. 7). A control switch (not shown) may be attached to the instrument panel of the motor vehicle for controlling the reversible motor 111 to rotate clockwise or counter-clockwise (a control switch for this purpose is of the known art and not within the scope of the present invention, and therefore, it is not illustrated in the specification).

Referring to FIG. 2 again, elastic bands 33 may be sewn on the curtain 3 permitting the curtain to be stretched outwards. By means of this arrangement, the two symmetrical side tracks 2 can be obliquely secured behind a windshield (which has a bottom edge broader than its top edge) at two opposite sides.

Figure 9:
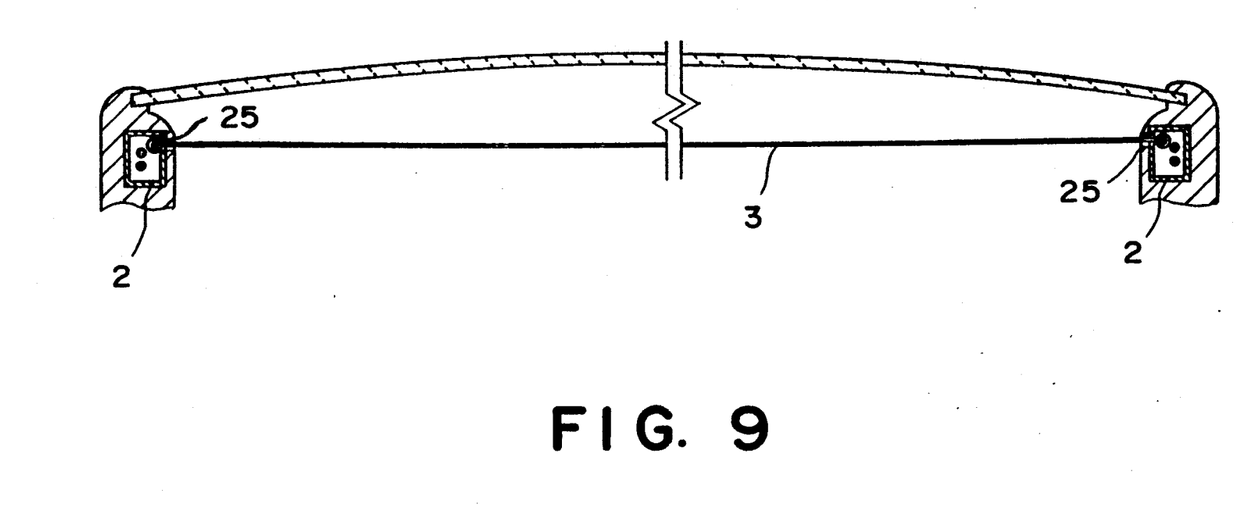
FIG. 9 is a sectional bottom view of the windshield curtain control showing that the two symmetrical side tracks are respectively fastened inside the two opposite side channels for windshield.

Referring to FIG. 9, the two symmetrical side tracks 2 may be fastened inside the two opposite side channels for the windshield, and therefore, the whole device will not be seen from the outside.

Figure 10:
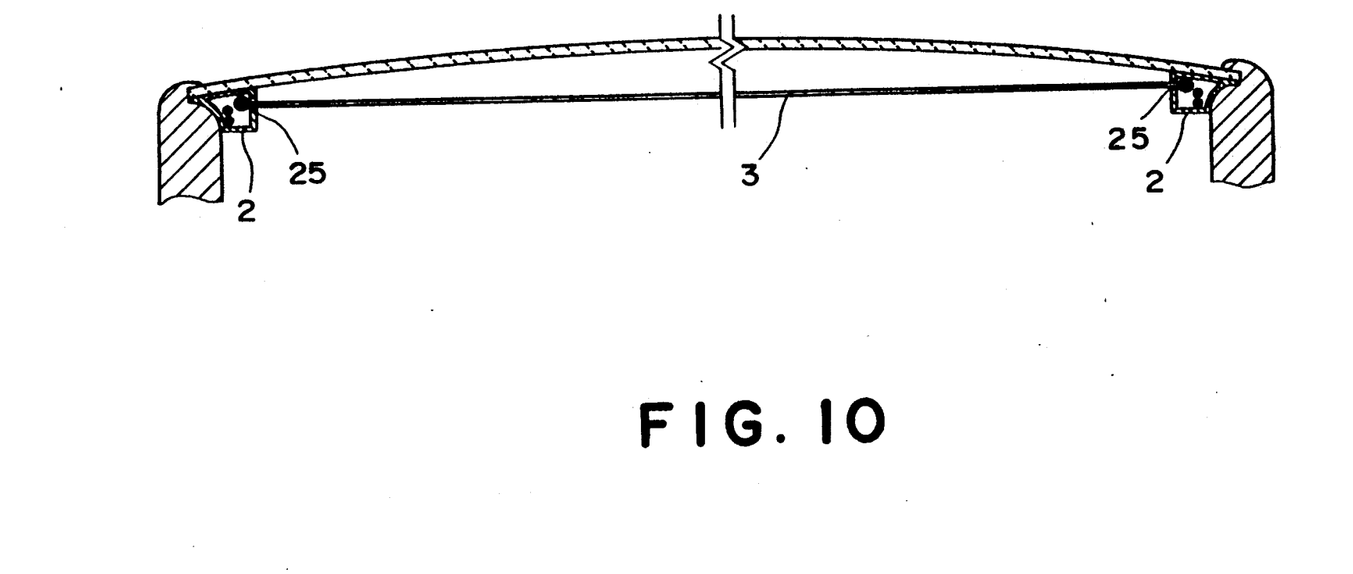
FIG. 10 is a sectional bottom view of an alternate form of the windshield curtain control.

Referring to FIG. 10, the two symmetrical side tracks 2 may be attached to the body of a motor vehicle behind its windshield at two opposite sides with side fins (not shown) thereof respectively inserted in either side channel for the windshield. In this alternate arrangement, the shape of the side tracks 2 is preferably modified to fit the curvature of the two opposite side channels for the windshield.

Figure 11:
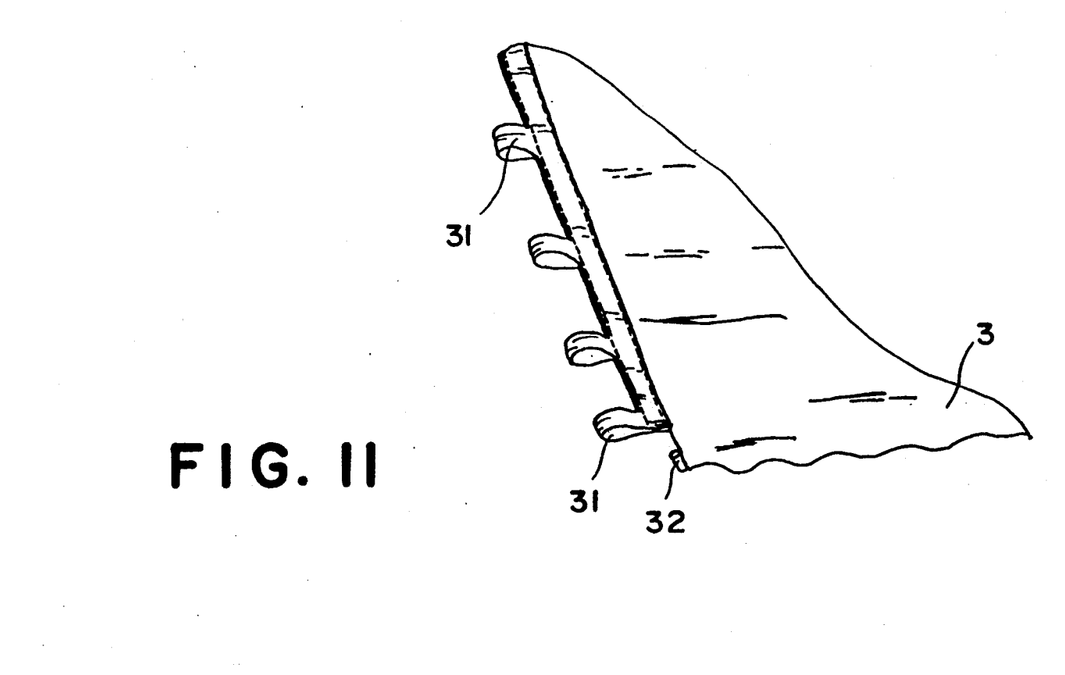
FIG. 11 illustrates an alternate form of the loops at either side edge of the curtain.

Referring to FIG. 11, therein illustrated is an alternate form of the loops 31 on either side edge of the curtain 3. In this alternate form, the loops 31 are formed by folding up the two opposite side edges of the curtain 3 and sewing them into two sewn loops, and then cutting the two sewn loops into two series of loops 31. A wear-resisting lining may be attached to each sewn loop before cutting into loops 31. Lubricating oil may be applied to the loops 31 for reducing friction.

What is claimed is:

1. A motor vehicle windshield curtain control comprising: a casing located behind the windshield of a motor vehicle adjacent to a top portion of the windshield; side tracks located behind said windshield adjacent to opposite sides of the windshield; a curtain received inside said casing said curtain having a rear end edge, a front end edge and opposite side edges; and a driving mechanism including endless drive belts set inside said casing and controlled to let out or take up said curtain from the casing such that said curtain can be hung between said two side tracks to cover said windshield or be received inside said casing wherein said curtain has the rear end edge secured to said casing, the front end edge secured to said endless drive belts, and the two opposite side edges slidably secured by loops to a rod located inside each of said two side tracks.

2. The motor vehicle windshield curtain control of claim 1, wherein said casing defines a holding space therein and further comprising a division plate dividing the holding space into a first chamber for holding said driving mechanism and a second chamber for holding said curtain.

3. The motor vehicle windshield curtain control of claim 1, wherein said driving mechanism comprises: a revolving axle rotatably driven by a reversible motor; drive rollers each coupled to said revolving axle at opposite ends thereof; a plurality of guide pulleys respectively fastened in each of said two side tracks; end pulleys each respectively fastened in said side tracks; and said endless belts each respectively mounted on said drive rollers and said end pulleys and guided by said guide pulleys.

4. The motor vehicle windshield curtain control of claim 3, wherein rotating said reversible motor in a first direction causes said endless belts to be respectively rotated on said rollers and said end pulleys in one direction to let out said curtain; and rotating said reversible motor in a second, opposite direction causes said endless belts to be respectively rotated on said rollers and said end pulleys in an opposite direction to take up said curtain.

5. The motor vehicle windshield curtain control of claim 1, comprising two side tracks, wherein said two side tracks obliquely extend downward from said casing, each of which defining an elongated channel at an inner side to accommodate said curtain.

* * * * *